(12) United States Patent
Lozovsky

(10) Patent No.: US 10,379,424 B2
(45) Date of Patent: Aug. 13, 2019

(54) HANDS-FREE SELFIE RIG

(71) Applicant: Sergiy Lozovsky, Santa Clara, CA (US)

(72) Inventor: Sergiy Lozovsky, Santa Clara, CA (US)

( * ) Notice: Subject to any disclaimer, the term of this patent is extended or adjusted under 35 U.S.C. 154(b) by 0 days.

(21) Appl. No.: 15/967,487

(22) Filed: Apr. 30, 2018

(65) Prior Publication Data

US 2019/0033692 A1    Jan. 31, 2019

Related U.S. Application Data

(60) Provisional application No. 62/538,802, filed on Jul. 31, 2017.

(51) Int. Cl.
| | | |
|---|---|---|
| *G03B 17/56* | (2006.01) | |
| *A42B 3/04* | (2006.01) | |
| *F16M 13/00* | (2006.01) | |
| *G03B 17/00* | (2006.01) | |
| *F16M 13/04* | (2006.01) | |
| *A42B 3/06* | (2006.01) | |

(52) U.S. Cl.
CPC ............. *G03B 17/561* (2013.01); *A42B 3/04* (2013.01); *A42B 3/042* (2013.01); *F16M 13/00* (2013.01); *F16M 13/04* (2013.01); *G03B 17/00* (2013.01); *G03B 17/56* (2013.01); *A42B 3/066* (2013.01)

(58) Field of Classification Search
CPC ..................................................... A42B 3/042
USPC ........................................................ 396/420
See application file for complete search history.

(56) References Cited

U.S. PATENT DOCUMENTS

| | | | | |
|---|---|---|---|---|
| 3,900,140 | A * | 8/1975 | Kelso ..................... | F16M 13/04 224/185 |
| 4,037,763 | A * | 7/1977 | Turchen ................. | F16M 13/04 224/153 |
| 5,216,476 | A * | 6/1993 | Lanckton ............... | G01C 11/06 356/2 |
| 5,435,515 | A * | 7/1995 | DiGiulio ................ | F16M 11/10 224/908 |
| 6,450,377 | B1 * | 9/2002 | Oriolo .................... | F16M 13/04 224/201 |
| 6,718,130 | B2 * | 4/2004 | Grober ................... | A61G 13/10 396/419 |
| 7,484,687 | B2 * | 2/2009 | Martin .................... | B64C 15/00 244/4 A |
| 2005/0259715 | A1 * | 11/2005 | Lee ........................ | G01N 25/72 374/124 |
| 2006/0221072 | A1 * | 10/2006 | Se .......................... | G01C 11/06 345/420 |
| 2006/0262274 | A1 * | 11/2006 | Brown ................... | F16M 13/04 352/243 |
| 2010/0006611 | A1 * | 1/2010 | Knowles .................. | A45F 3/14 224/257 |
| 2010/0278523 | A1 * | 11/2010 | Brown .............. | F16M 11/2035 396/421 |
| 2014/0139679 | A1 * | 5/2014 | Orbassano ............ | F16M 11/06 348/157 |
| 2014/0339382 | A1 * | 11/2014 | Steubing ................ | F16M 13/04 248/128 |
| 2016/0195798 | A1 * | 7/2016 | Nenov ................... | F16M 13/04 348/373 |

* cited by examiner

*Primary Examiner* — Clayton E. LaBalle
*Assistant Examiner* — Kevin C Butler

(57) ABSTRACT

The present invention relates to a novel hands-free video/still image camera rig/mount to capture still images or video recording of the user (rig operator).

11 Claims, 3 Drawing Sheets

HANDS-FREE SELFIE RIG

CROSS-REFERENCE TO RELATED APPLICATIONS

The present Utility patent application claims priority benefit of the U.S. provisional application for patent Ser. No. 62/538,802 entitled "HANDS-FREE SELFIE RIG" filed Jul. 31, 2017 under 35 U.S.C. 119(e). The contents of this related provisional application are incorporated herein by reference for all purposes to the extent that such subject matter is not inconsistent herewith or limiting hereof.

INCORPORATION BY REFERENCE OF SEQUENCE LISTING PROVIDED AS ATEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

The present invention relates to a novel hands-free video/still image camera rig/mount to capture still images or video recording of the user (rig operator).

BACKGROUND OF THE INVENTION

It is nice to take videos of yourself while doing sports or some other activities. Friends are not always around to handle the camera. Selfie stick takes out one hand out of action, which is not acceptable in some sports like skiing, biking, etc. Most of these sports require a helmet, so a selfie poles can be mounted on the helmet. There are products on the market that try to address this problem.

"Rhino GoPro Accessories: 360 Swivel & Poles for GoPro Camera" (https://www.kickstarter.com/projects/rhinocg/rhino-gopro-accessories-360-swivel-and-poles-for-g?ref=discovery) In this solution horizontal poles have the only one flexibility dimension—rotation around vertical axis. Such lack of flexibility makes using the rig uncomfortable, due to the momentum created by the long poles and cameras when they are moved with the tilt of the head. A better picture/video can be produced when camera is stabilized and doesn't move too much even when the head moves.

"CAMERA MOUNT FOR SELF-VIDEO RECORDING" (US Patent Application 20160195798 A1) This solution uses a ball joint, which provides too much flexibility and results in a shaky video (in the lateral direction). Camera stabilization is not addressed in any simple and efficient way. Backpack-like harness is required. That and additional weight is excessive for sports where agility is required. Added dimensions prevent from using a chairlift.

Current invention addresses shortcomings of the existing solutions and provides following advantages:
  Lightweight, shouldn't obstruct head movement;
  Self-stabilized, self-leveled;
  Flexible/modular, allow use of wide range of equipment like selfie sticks;
  Waterproof;
  Easy to use and transport (foldable); Can be kept on a helmet when not in use;
  Affordable; small number of inexpensive parts;
  Standard mounts; can be mounted on helmet, backpack vertical pole, etc.

For the rig not to obstruct head movements and camera stabilization (camera position is independent of the user movement) as many as possible flexibility dimensions should be supported. At the same time too much flexibility can result in a shaky video. Tests with a ball joint, which allows flexibility in 3 dimensions, resulted in camera shaking in lateral direction. When camera poles are mounted in a straight line the rig is unstable and cameras are moving up and down especially with the extreme sports.

For the best results lateral flexibility should be excluded, so the camera poles have 2 dimensions of the flexibility—rotation around vertical axis (swivel) and pivoting up and down, but not sideways.

Self-leveling, self-stabilization is achieved by moving rig center of gravity lower than the pivot axis (suspension point). This is done by pointing camera poles down (so the angle between poles measured from the side of the ground is less than 180 degrees).

Friction in pivot and swivel is controlled (additional friction can be applied) to reduce jitter, oscillation and other unwanted movements.

BRIEF SUMMARY OF THE INVENTION

The present invention comprises a novel selfie rig generally consisting of two poles, pole holder (which keeps an angle less than 180 degrees between poles) and rig base. The rig base connects to the pole holder at the top and to the mount point (helmet, vertical pole, etc.) at the bottom. The rig base provides swivel and pivot flexibility and raises the pole holder over the mount point (so that there is enough space for the poles to go up and down before hitting the helmet or other objects).

Cameras are mounted at the poles, usually at the end. Camera poles are foldable or collapsible. Poles are folded when the rig is not in use, which is convenient for transportation. As the rig is light it can be kept on the helmet when not in use which save the effort of storing and carrying it between taking the video.

The angle less than 180 degrees between poles moves center of gravity of the suspended part of the rig lower than the pivot axis. That provides self-leveling/self-stabilization of the rig and cameras. The rig should be balanced before use. To make balancing easy the similar poles and cameras are used. Cameras can be directed to the user or away from him/her. If one camera is used, then counterweight is used on the opposite pole for balancing. It's possible to mount devices other than cameras—portable speakers, lights, etc.

Additional friction can be applied to the pivot and swivel for additional camera stabilization.

The angle between poles can be adjustable, so operator can set the desired angle.

If the length of one pole is changed that changes the balance and elevation of cameras. That helps in setting the desired point of view (POV).

The angles greater than 180 degrees can be supported, so poles are pointing up and provide additional POVs. As center of gravity of the rig goes up pivot action should be disabled.

Poles can be easily replaced if broken or for customization purposes.

The sample embodiments use standard GoPro mounts, which makes it easy to use with existing cameras, mounting points, etc.

Safety features such as magnet mounts can be used.

BRIEF DESCRIPTIONS OF THE DRAWINGS

The disclosed embodiments have other advantages and features which will be more readily apparent from the following detailed description of the invention, when taken in conjunction with the accompanying drawings, in which.

DETAILED DESCRIPTION

The figures and the following description relate to preferred embodiments by way of illustration only. It should be noted that from the following discussion, alternative embodiments of the structures and methods disclosed herein would be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Hands-Free Selfie Rig

Figure 1:
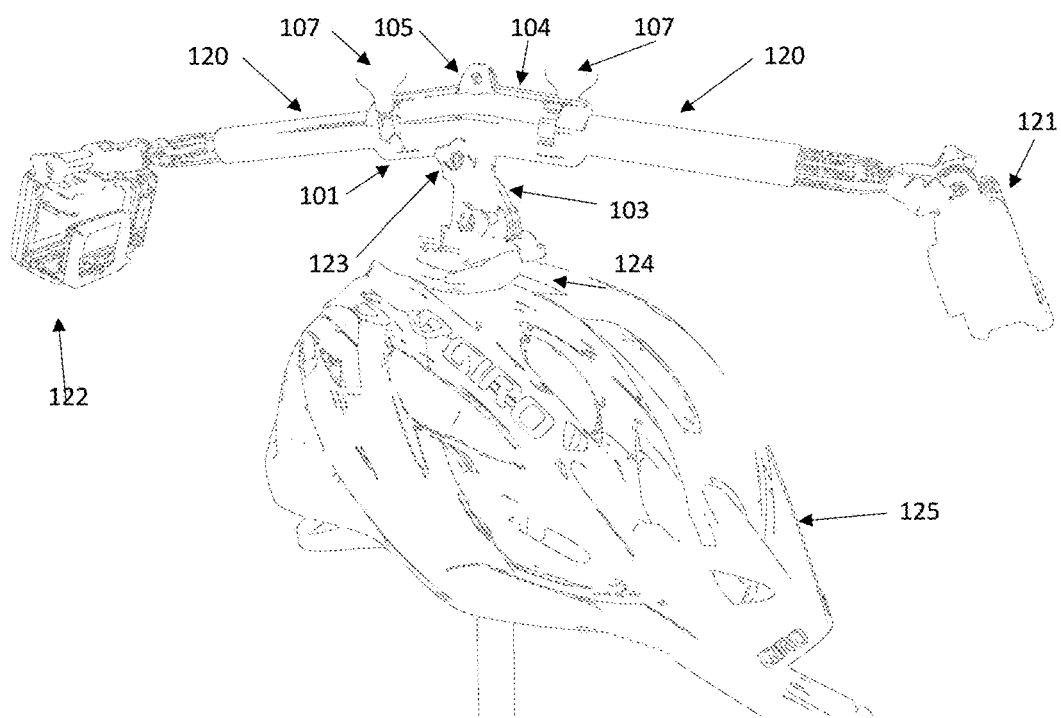
FIG. 1 illustrates a perspective view of the selfie rig (invention), according to one embodiment, where camera poles are pointing down and collapsed.

FIG. 1 Illustrates selfie rig (the invention) mounted on a bicycle helmet 125. The rig includes the suspended assembly and base assembly.

The suspended assembly includes lower 101, upper 104 holder parts which hold collapsible camera poles 120, camera 121, second camera or a counterweight 122 (clear case filled with water), hose clamps 107 which bind holder parts 101, 104 together and create pressure to secure camera poles 120 in place.

The base assembly includes swivel base 103 and other parts presented in Pics. 5, 6 and 7. The base assembly is connected to the helmet 125 with GoPro quick release mount 124.

The holder keeps the angle less than 180 degrees between poles (measured from the side of the base assembly). In this embodiment the angle is fixed. Other embodiments can support changing this angle.

The suspended assembly is mated with the base assembly and can pivot around a pivot bolt 123. The pivot action allows camera 121 go up and down and second camera or a counterweight 122 go down and up respectively. The pivot action creates one dimension of flexibility for the suspended assembly. By tightening the pivot bolt 123 an additional friction can be applied to the pivot. If tightened enough—the pivot action can be disabled.

The base assembly includes swivel, which supports 360 degrees rotation of the suspended assembly creating additional dimension of flexibility.

With camera poles collapsed the rig is compact and can be kept on the helmet when not in use.

Figure 2:
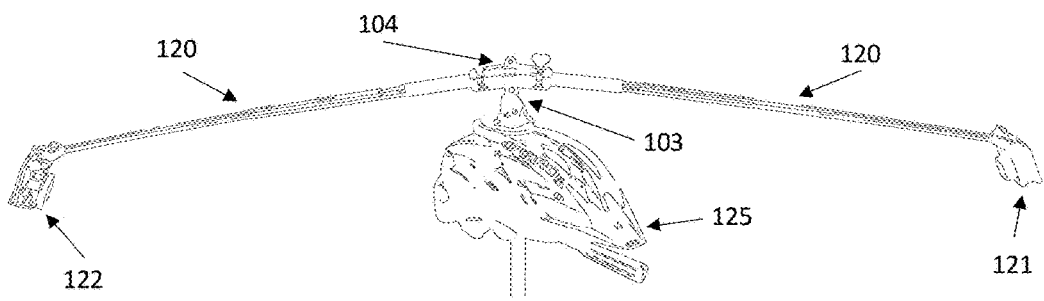
FIG. 2 illustrates a perspective view of the selfie rig (invention), according to one embodiment, where camera poles are pointing down and extended.

FIG. 2 illustrates the rig from FIG. 1 with the camera poles extended. Poles can be extended to different lengths to set a desired Point of View for the cameras and rigidity of the suspended assembly. More the poles are extended—bigger the flex.

The suspended assembly can be balanced by varying camera 121 and counterweight 122 weights and by the length to which camera poles 120 are extended. The suspended assembly can be balanced in a way when two sides (cameras) are at the same or at different levels. If camera 121 pole 120 is shortened it goes to higher elevation. The pivot action supports self-leveling of the suspended assembly as its center of gravity is lower than the suspension point (the pivot bolt 123).

The pivot and swivel actions reduce forces applied to the mount point (and head when the rig is mounted on a helmet) and vice versa; the forces applied to the suspended assembly from the base are minimized. Reduced forces together with big momentum created by the extended poles with cameras provide cameras/image stabilization. The suspended assembly stays relatively steady (in equilibrium position) despite the movements of the operator (mount point). Reduced forces applied to the helmet allow moving head freely and the rig doesn't obstruct head movements. Helmet movement in two dimensions is not translated into camera movement.

The suspended assembly tends to stay in equilibrium position (due to the gravity, inertia and momentum forces). The suspension (swivel and pivot) is designed to minimize forces pushing the suspended assembly from the equilibrium position. If suspended assembly gets off the equilibrium position—the returning force will move it back to the equilibrium position. Controlled friction in the pivot is designed to reduce the oscillations.

The pivot doesn't allow lateral movement of the suspended assembly. Tests showed that lateral flexibility leads to the shaky video.

Figure 3:
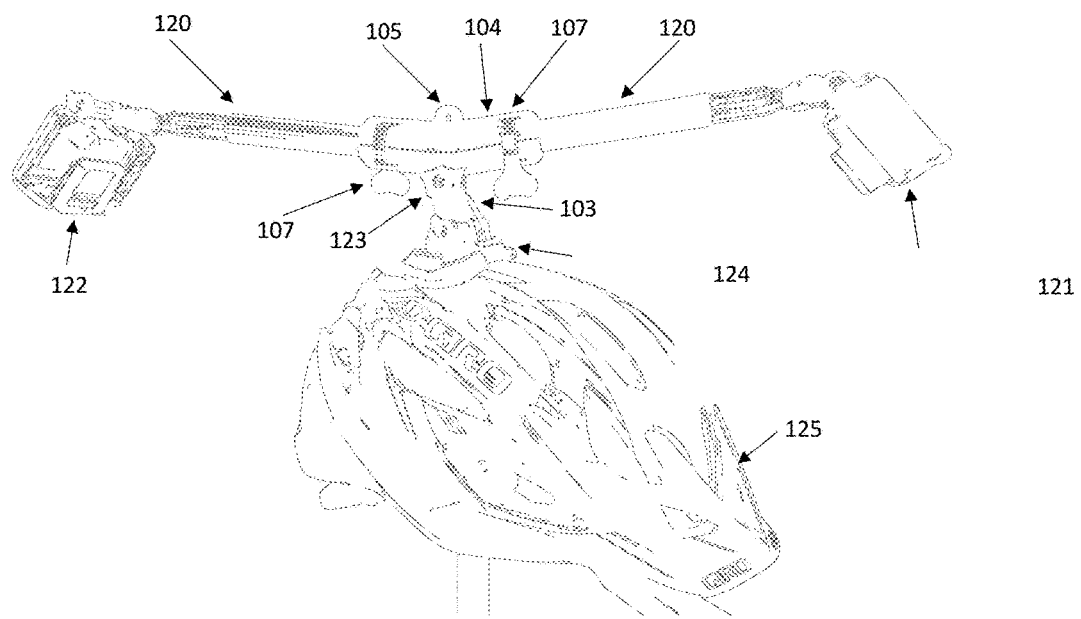
FIG. 3 illustrates a perspective view of the selfie rig (invention), according to one embodiment, where camera poles are pointing up and collapsed.

FIG. 3 shows the same embodiment when the holder is mated to the base assembly with knuckles 105. Such configuration creates the angle greater than 180 degrees between the camera poles 120 when measured from the base assembly side.

Figure 4:
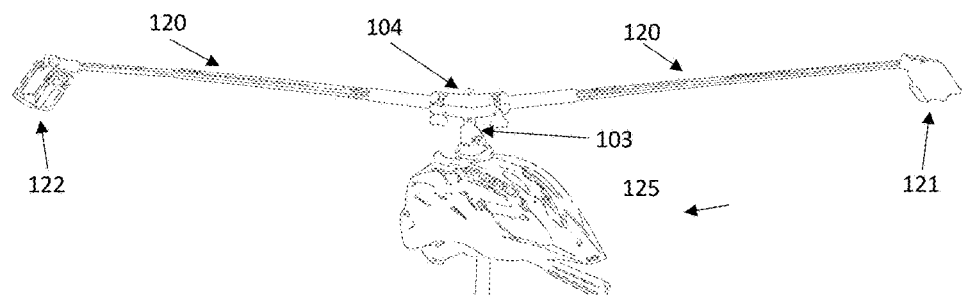
FIG. 4 illustrates a perspective view of the selfie rig (invention), according to one embodiment, where camera poles are pointing up and extended.

FIG. 4 shows the same set-up as on FIG. 3, but with the extended camera poles. With such set-up center of gravity of the suspended assembly is higher than the suspension point (the pivot bolt 123). That makes self-leveling impossible and pivot action should be disabled by tightening the pivot bolt 123 to fix the desired POV. The swivel action provides one dimension of the flexibility for such set-up, which can be used to elevate cameras to create higher Point of View and get cameras out of the way if they interfere with movements of the body parts, equipment, ground, etc.

Figures 5, 6, 7:
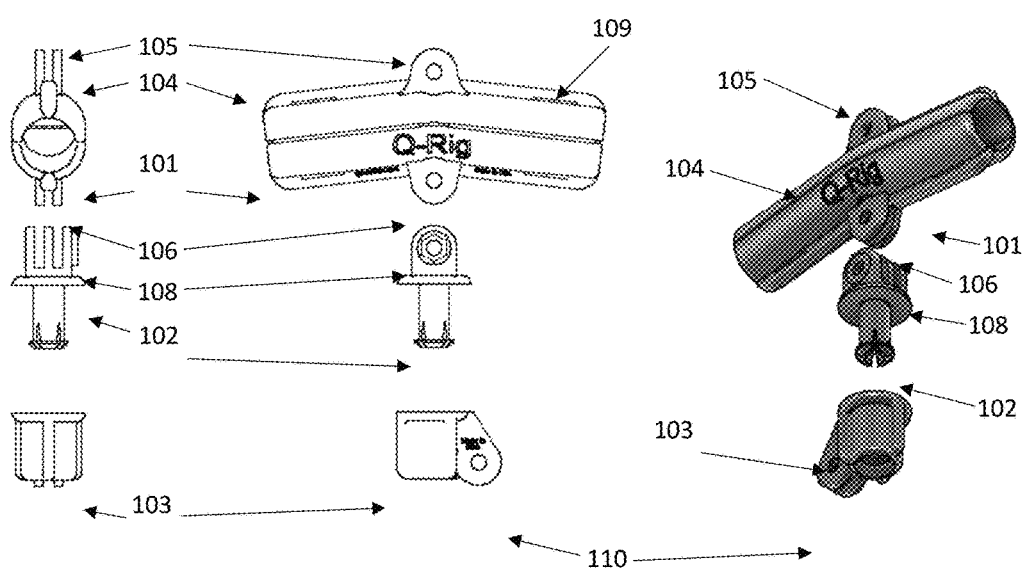
FIGS. 5, 6 and 7 illustrate the exploded views of the pole holder, pivot and swivel assembly, according to one embodiment.

FIGS. 5, 6 and 7 illustrate the exploded views of the holder, pivot and swivel assembly for the embodiment presented at FIGS. 1, 2, 3 and 4.

- 101—lower part of the pole holder; it is named as "lower" for convenience only; in some set-ups it can be positioned higher than another part 104 called "upper";
- 104—upper part of the pole holder; it is named as "upper" for convenience only; in some set-ups it can be positioned lower than another part 101 called "lower";
- 102—rotating part of the swivel including shaft and knuckles 108; snap-fit connection is used to keep this part in place inside of the swivel base 103 allowing it to rotate;
- 103—swivel base;
- 105—knuckles on the upper part 104 of the holder that can be mated to pivot knuckles 108;
- 106—knuckles on the lower part 101 of the holder that can be mated to pivot knuckles 108;
- 108—knuckles on the swivel rotating part, which can be mated to knuckles 105 or 106;
- 110—knuckles compatible with GoPro mounts, including quick release mounts;
- 109—pass-through holes for the hose clamps 107.

The invention claimed is:

1. A camera mount system comprising:
    A suspended assembly comprising:
        A first and a second camera poles; each first and second camera pole has a first end and a second end; a camera attachment is provided at each of the first end of each of the first and the second camera pole;
        a holder; the holder connected to each second end of each first and second camera pole: the holder supports the first and second camera poles at each of their second ends in such way that each of the first and second camera poles extend slightly downward from their second ends to their first ends along a plane: the planes that the first and second camera poles extent along intersect such that an angle formed at the intersection of the planes is less than 180 degrees;
    a base assembly comprising:
        a swivel assembly;
        a helmet mount;
        the suspended assembly is coupled to the base assembly though a pivot joint; the pivot joint has a pivot axis which is orthogonal to the first and second camera poles and allows movement of the suspended assembly around the pivot axis; the pivot joint axis is located higher than a center of mass of the suspended assembly with the first and second camera poles attached: the pivot joint is connected to the swivel assembly and; the swivel assembly is connected to the helmet mount;
        the base assembly is located under the suspended assembly.

2. The camera mount system of claim 1, wherein two camera poles and the pole holder are manufactured as one part.

3. The camera mount system of claim 1, further comprising two cameras attached to the camera attachments at the end of the poles.

4. The camera mount system of claim 1, further comprising a first camera attached to the first camera attachment and a balancing counterweight attached to the second camera attachment.

5. The camera mount system of claim 1, wherein pole holder and poles are shaped in a way to minimize contact with a helmet.

6. The camera mount system of claim 1, wherein a desired friction can be applied to the pivot joint to reduce the oscillations.

7. The camera mount system of claim 1, wherein a desired friction can be applied to the swivel to reduce the circular movement.

8. The camera mount system of claim 1, wherein camera poles are foldable or collapsible.

9. The camera mount system of claim 1, wherein devices other than cameras are mounted on the camera sticks, such as sound systems or lights.

10. The camera mount system of claim 1, wherein the angle between poles can be adjustable.

11. The camera mount system of claim 1, wherein the angle between poles can be greater than 180 degrees to provide higher Point of View.

* * * * *